(12) United States Patent
Yanai (10) Patent No.: US 7,804,540 B2
(45) Date of Patent: Sep. 28, 2010

(54) IMAGE PICKUP APPARATUS HAVING A PLURALITY OF DIFFERENT READOUT MODES

(75) Inventor: Toshikazu Yanai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 146 days.

(21) Appl. No.: 11/435,897

(22) Filed: May 18, 2006

(65) Prior Publication Data
US 2006/0209202 A1 Sep. 21, 2006

Related U.S. Application Data

(63) Continuation of application No. 10/212,257, filed on Aug. 6, 2002, now Pat. No. 7,079,184.

(30) Foreign Application Priority Data

Aug. 8, 2001 (JP) ............................. 2001-240568

(51) Int. Cl.
*H04N 5/335* (2006.01)
(52) U.S. Cl. ...................................... 348/319; 348/312
(58) Field of Classification Search ................ 348/319, 348/315, 312, 320, 317, 311, 280, 222.1
See application file for complete search history.

(56) References Cited

U.S. PATENT DOCUMENTS

| 5,153,732 A | 10/1992 | Oda et al. .................. 348/243 |
| 5,166,799 A | 11/1992 | Hasegawa et al. ........... 348/252 |
| 5,177,614 A | 1/1993 | Kawaoka et al. ............ 348/321 |
| 6,661,451 B1 * | 12/2003 | Kijima et al. ............ 348/220.1 |
| 6,809,764 B1 | 10/2004 | Misawa et al. .............. 348/272 |
| 6,817,718 B2 | 11/2004 | Katoh ......................... 353/31 |
| 6,933,972 B2 | 8/2005 | Suzuki et al. ............... 348/302 |

FOREIGN PATENT DOCUMENTS

JP 2000-201355 7/2000

* cited by examiner

*Primary Examiner*—Jason Chan
*Assistant Examiner*—Nicholas G Giles
(74) *Attorney, Agent, or Firm*—Fitzpatrick, Cella, Harper & Scinto (57) ABSTRACT

An image pickup apparatus includes horizontally and vertically arranged charge-generating pixels, vertical charge transfer elements reading out charges generated by the pixels of vertical pixel lines, a horizontal charge transfer element reading out charges read out by the vertical transfer elements, in the horizontal direction, and a controller controlling a first mode dividing the pixel charges into fields and sequentially reading out the fields to form an image of one frame, and a third mode thinning out the pixel charges of a first field and reading them out to the vertical transfer elements, thinning out charges of the pixels of a third field to read them out to the vertical transfer elements, adding together the charges read out to the vertical transfer elements in the first and third fields and reading out the added charges to the horizontal charge transfer element to form an image of one frame.

5 Claims, 13 Drawing Sheets

IMAGE PICKUP APPARATUS HAVING A PLURALITY OF DIFFERENT READOUT MODES

This application is a continuation application of application Ser. No. 10/212,257, filed Aug. 6, 2002, allowed.

BACKGROUND OF THE INVENTION

1. Field of the Invention

The present invention relates to an image pickup apparatus for picking up an image of an object.

2. Related Background Art

Japanese Patent Application Laid-Open No. 2000-201355 A discloses a method of reading out charges of all pixels by performing partial readout for three times using an interline type solid state image pickup element, that is, a reading out method in which one frame is constituted by three fields.

Moreover, it is also disclosed that an image pickup apparatus using the reading out method includes switching means for switching between an all pixel mode for reading out charges of all pixels in three fields and a monitoring mode for repeating read-out of one field among the three fields.

However, the conventional example has a problem in that charges of pixels of fields other than a field to be outputted are not effectively utilized in the monitoring mode. Further, there is a problem in that, since a solid state image pickup element used in an electronic still camera tends to have higher number of pixels under present circumstances, a thinning-out ratio of 1/3 is insufficient.

SUMMARY OF THE INVENTION

The present invention has been devised in view of the above and other drawbacks and, it is accordingly an object of the present invention to efficiently read out signals from a plurality of pixels arranged in horizontal and vertical directions.

According to one aspect, the present invention relates to an image pickup apparatus comprising a plurality of pixels which are arranged in a horizontal direction and a vertical direction and which generate charge corresponding to optical signals, the pixels in the vertical direction being arranged in a plurality of lines. The apparatus also comprises a plurality of vertical charge transfer elements provided for the plurality of lines of the pixels arranged in the vertical direction to read out the charges generated by the pixels of the pixel lines in the vertical direction. In addition, the apparatus also comprises a horizontal charge transfer element that reads out the charges read out by the plurality of vertical charge transfer elements, in the horizontal direction. And the apparatus further comprises control means for controlling a first photographing mode arranged to divide the charges of the plurality of pixels into a plurality of fields and sequentially read out the plurality of fields to form an image of one frame, and a third photographing mode arranged to thin out the charges of the pixels included in a first field of the plurality of fields on a plurality-of-lines basis to read out the thinned-out charges to the vertical charge transfer elements and thin out the charges of the pixels included in a third field of the plurality of fields, different from the first field, on a plurality-of-lines basis to read out the thinned-out charges to the vertical charge transfer elements so that the charges read out to the vertical charge transfer elements in the first and third fields are added together and the added charges are read out to the horizontal charge transfer element to form an image of one frame.

In order to achieve the above-mentioned object, according to an embodiment of the present invention, there is provided an image pickup apparatus comprising:

an image pickup area having a plurality of pixels which are arranged in a horizontal and a vertical direction and which generate charges corresponding to optical signals;

a plurality of vertical charge transfer devices which are provided for respective columns of pixels arranged in the vertical direction and which receive the charges generated by the pixels to transfer the charges in the vertical direction;

a horizontal charge transfer device that receives the charges transferred from the plurality of vertical charge transfer devices to transfer the charges in the horizontal direction; and a driving circuit having following first to fifth readout modes on the assumption that twelve horizontal pixel rows continuous in the vertical direction are formed as one set, the twelve horizontal pixel rows being a first horizontal pixel row, a second horizontal pixel row, a third horizontal pixel row, a fourth horizontal pixel row, a fifth horizontal pixel row, a sixth horizontal pixel row, a seventh horizontal pixel row, an eighth horizontal pixel row, a ninth horizontal pixel row, a tenth horizontal pixel row, an eleventh horizontal pixel row and a twelfth horizontal pixel row, a first readout mode for selectively reading out charges of the first horizontal pixel row, the fourth horizontal pixel row, the seventh horizontal pixel row and the tenth horizontal pixel row to the vertical charge transfer devices; a second readout mode for selectively reading out charges of the second horizontal pixel row, the fifth horizontal pixel row, the eighth horizontal pixel row and the eleventh horizontal pixel row to the vertical charge transfer devices; a third readout mode for selectively reading out charges of the third horizontal pixel row, the sixth horizontal pixel row, the ninth horizontal pixel row and the twelfth horizontal pixel row to the vertical charge transfer devices; a fourth readout mode for selectively reading out charges of the first horizontal pixel row and the tenth horizontal pixel row to the vertical charge transfer devices; and a fifth readout mode for selectively reading out charges of the fifth horizontal pixel row and the eighth horizontal pixel row to the vertical charge transfer devices.

Also, according to another aspect of the present invention, there is provided an image pickup apparatus comprising:

a plurality of pixels which are arranged in a horizontal and a vertical direction and which generate charges corresponding to optical signals;

a plurality of vertical charge transfer devices which are provided for respective columns of pixels arranged in the vertical direction and which receive the charges generated by the pixels to transfer the charges in the vertical direction, each of the vertical charge transfer devices having a plurality of transfer electrodes for each pixel so as to have a first transfer electrode for transfer in the vertical charge transfer device and a second transfer electrode for the transfer in the vertical charge transfer device and the readout from the pixel to the vertical charge transfer device;

a horizontal charge transfer device that receives the charges transferred from the plurality of vertical charge transfer devices to transfer the charges in the horizontal direction;

a first common connection section for commonly connecting with the first transfer electrodes corresponding to a first horizontal pixel row, a fourth horizontal pixel row, a seventh horizontal pixel row and a tenth horizontal pixel row;

a 2Ath common connection section for commonly connecting with the second transfer electrodes corresponding the first horizontal pixel row and the tenth horizontal pixel row;

a 2Bth common connection section for commonly connecting with the second transfer electrodes corresponding to the fourth horizontal pixel row and the seventh horizontal pixel row;

a third common connection section for commonly connecting with the first transfer electrodes corresponding to a second horizontal pixel row, a fifth horizontal pixel row, an eighth horizontal pixel row and an eleventh horizontal pixel row;

a 4Ath common connection section for commonly connecting with the second transfer electrodes corresponding to the fifth horizontal pixel row and the eighth horizontal pixel row;

a 4Bth common connection section for commonly connecting with the second transfer electrodes corresponding to the second horizontal pixel row and the eleventh horizontal pixel row;

a fifth common connection section for commonly connecting with the first transfer electrodes corresponding to a third horizontal pixel row, a sixth horizontal pixel row, a ninth horizontal pixel row and a twelfth horizontal pixel row; and a sixth common connection section for commonly connecting with the second transfer electrodes corresponding to the third horizontal pixel row, the sixth horizontal pixel row, the ninth horizontal pixel row and the twelfth horizontal pixel row, wherein twelve horizontal pixel rows arranged continuously in the vertical direction are formed as one set, the twelve horizontal pixel rows being the first horizontal pixel row, the second horizontal pixel row, the third horizontal pixel row, the fourth horizontal pixel row, the fifth horizontal pixel row, the sixth horizontal pixel row, the seventh horizontal pixel row, the eighth horizontal pixel row, the ninth horizontal pixel row, the tenth horizontal pixel row, the eleventh horizontal pixel row and the twelfth horizontal pixel row.

Further, according to still another aspect of the present invention, there is provided an image pickup apparatus comprising:

a plurality of pixels which are arranged in a horizontal and a vertical direction and which generate charges corresponding to optical signals, wherein a color filter arrangement of a first order are arranged in horizontal pixel rows of odd numbers and a color filter arrangement of a second order are arranged in horizontal pixel rows of even numbers; and a drive circuit having a first mode for reading out pixel data of 2k+1 fields (k is a natural number) by an interlace operation from the plurality of pixels, a second mode for reading out pixel data of one field among the 2k+1 fields from the plurality of pixels, and a third mode for reading out images of a plurality of fields, the number of which is smaller than that of the 2k+1 fields, among the 2k+1 fields from the plurality of pixels.

Other objects and features of the present invention will be apparent from the following descriptions and the accompanying drawings, in which like reference characters designate the same or similar parts throughout the figures thereof.

DETAILED DESCRIPTION OF THE PREFERRED EMBODIMENTS

An embodiment of the present invention will be hereinafter described, in which a charge transfer device of a solid state image pickup element is explained using a CCD.

Figure 1:
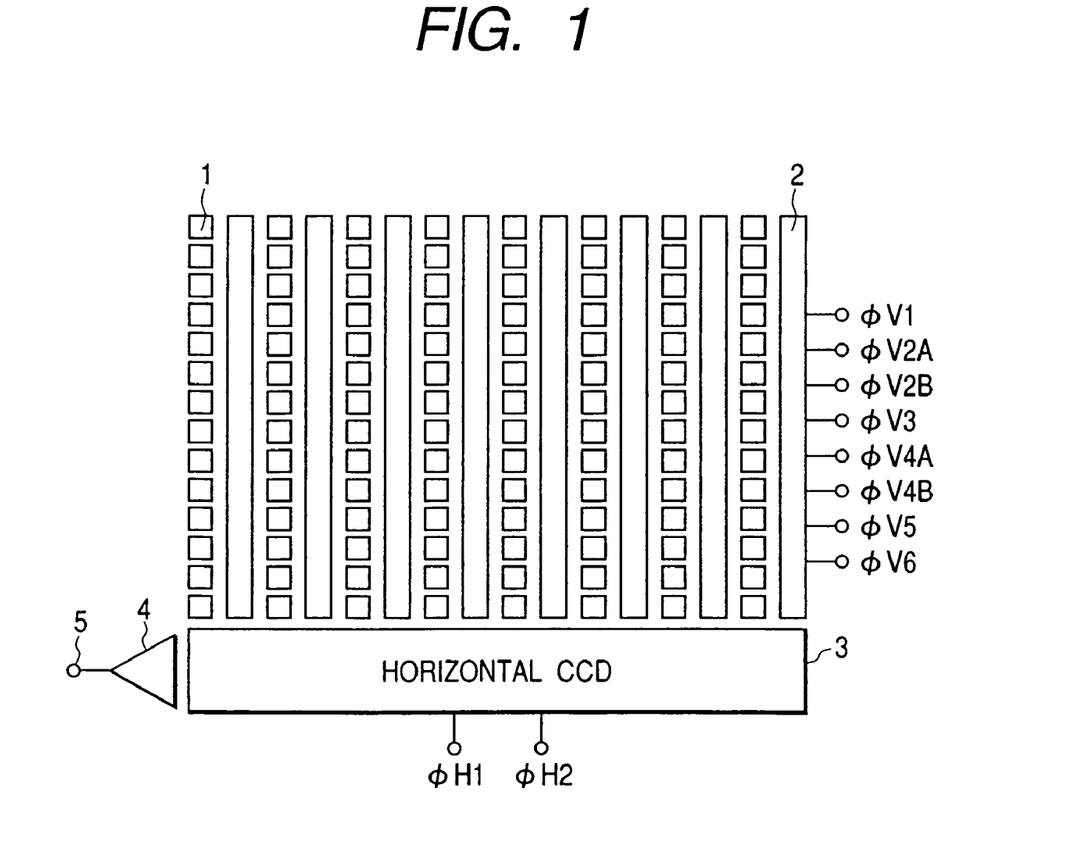
FIG. 1 is a schematic view showing a solid state image pickup element in an embodiment of the present invention.

FIG. 1 schematically shows an interline type solid state image pickup element in this embodiment.

Reference numeral 1 denotes pixels; 2, vertical CCDs; 3, a horizontal CCD; 4, an output section; and 5, a signal output terminal. Signal charges photoelectrically converted in the pixels 1 are sent to the vertical CCDs 2 by a readout pulse and transferred to the direction to the horizontal CCD 3 in order by six-phase driving pulses $\Phi V1$, $\Phi V2A$ and $\Phi V2B$, $\Phi V3$, $\Phi V4A$ and $\Phi V4B$, $\Phi V5$, and $\Phi V6$.

The horizontal CCD 3 transfers the signal charges for one horizontal pixel row, which are transferred from the vertical CCDs 2, to the output circuit 4 by two-phase driving pulses $\Phi H1$ and $\Phi H2$. The signal charges are converted into a voltage by the output circuit 4 and outputted from the image signal output terminal 5.

Figure 2:
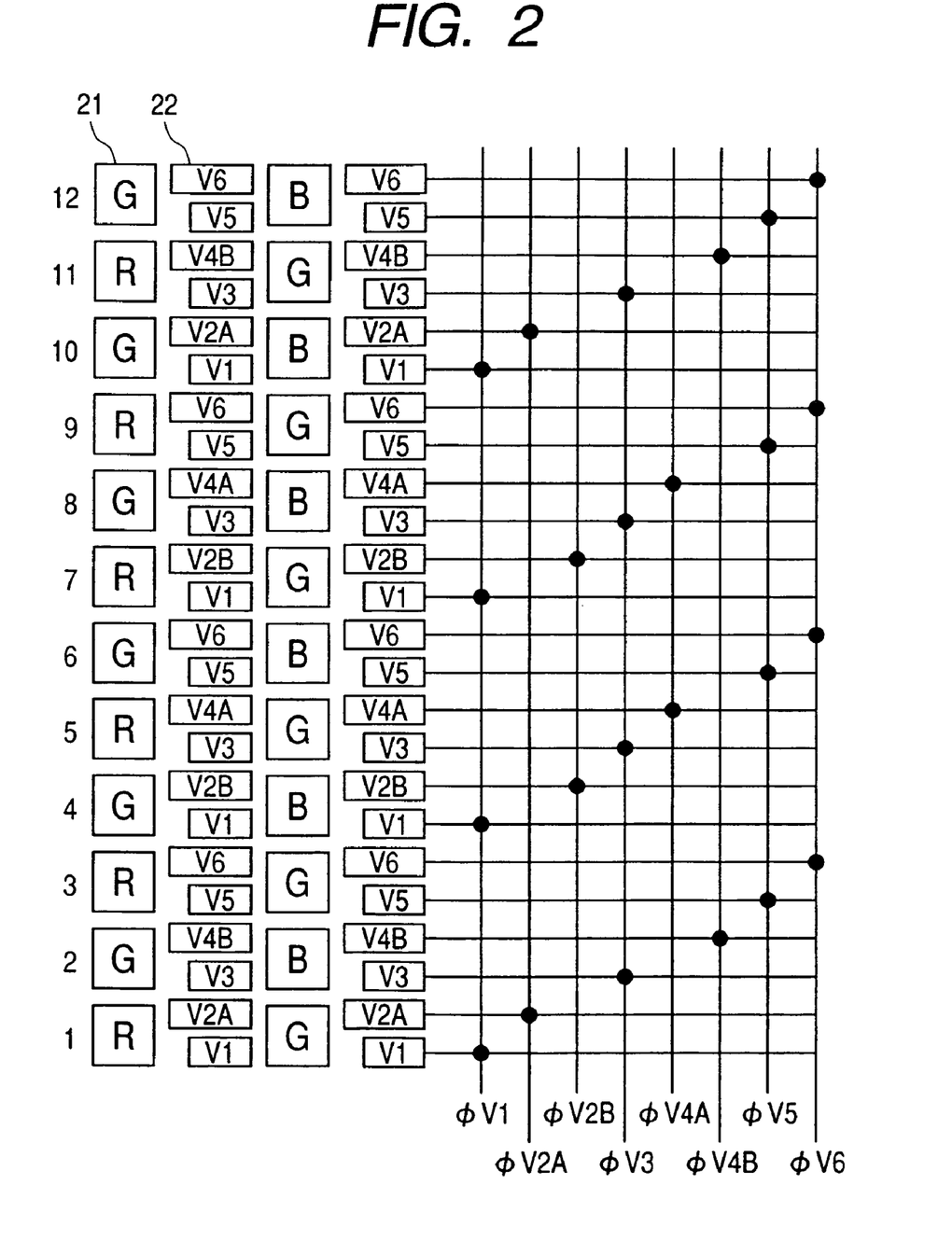
FIG. 2 is a view showing an arrangement of color filters and an arrangement of electrodes in the embodiment of the present invention.

FIG. 2 shows an arrangement of color filters and an arrangement of electrodes provided to the pixels of the solid state image pickup element of FIG. 1 only for vertical twelve pixels. These arrangements are repeated in the horizontal and vertical directions. Reference numeral 21 denotes pixels with color filters mounted thereon. A horizontal pixel row, in which red (R) and green (G) are repeated, and a horizontal pixel row, in which green (G) and blue (B) are repeated, are arranged alternately in the vertical direction. Reference numeral 22 denotes transfer electrodes of the vertical CCDs. One pixel corresponds to every two transfer electrodes of the vertical CCDs.

Six-phase driving pulses $\Phi V1$, $\Phi V2A$ and $\Phi V2B$, $\Phi V3$, $\Phi V4A$ and $\Phi V4B$, $\Phi V5$, and $\Phi V6$ are applied to transfer electrodes V1, V2A and V2B, V3, V4A and V4B, V5, and V6, which are denoted by the same numerals, respectively, whereby charges can be transferred in six phases. It is assumed that, among the six-phase driving pulses, $\Phi V2A$ and $\Phi V2B$ and $\Phi V4A$ and $\Phi V4B$, which relate to transfer of charges of the vertical CCDs, are the same, respectively.

In addition, readout pulses of a first field are applied to the transfer electrodes V2A and V2B also functioning as readout electrodes, and thereby charges of a first horizontal pixel row, a fourth horizontal pixel row, a seventh horizontal pixel row and a tenth horizontal pixel row can be read out to the vertical CCDs. Readout pulses of a second field are applied to the transfer electrodes V4A and V4B also functioning as readout electrodes, and thereby charges of a second horizontal pixel row, a fifth horizontal pixel row, an eighth horizontal pixel row and an eleventh horizontal pixel row can be read out to the vertical CCDs. Readout pulses of a third field are applied to the transfer electrode V6 also functioning as a readout electrode, and thereby charges of a third horizontal pixel row, a sixth horizontal pixel row, a ninth horizontal pixel row and a twelfth horizontal pixel row can be read out to the vertical CCDs.

Moreover, the transfer electrode V2A, the transfer electrode V2B, the transfer electrode V4A and the transfer electrode V4B are structured such that charges of the first horizontal pixel row and the tenth horizontal pixel row, charges of the fourth horizontal pixel row and the seventh horizontal pixel row, charges of the fifth horizontal pixel row and the eighth horizontal pixel row and charges of the second horizontal pixel row and the eleventh horizontal pixel row can be read out to the vertical CCDs, respectively.

Figure 3:
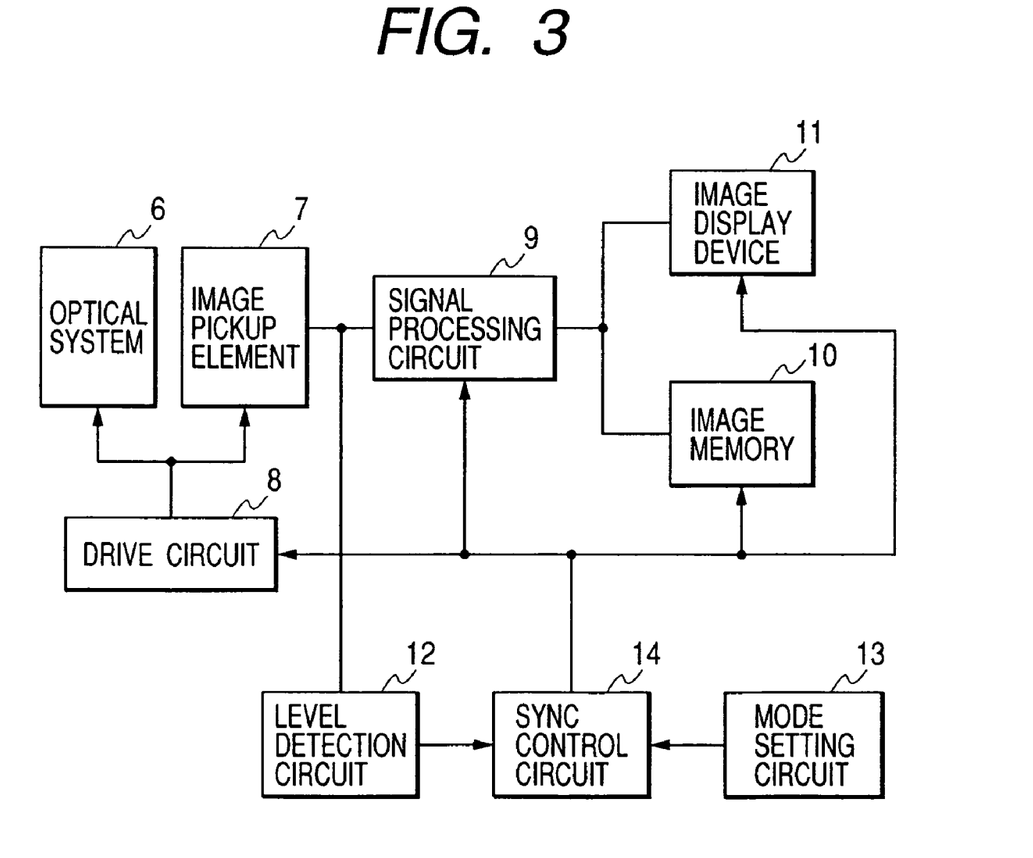
FIG. 3 is a block diagram of the solid state image pickup apparatus in the embodiment of the present invention.

FIG. 3 shows a block diagram of the image pickup apparatus. Reference numeral 6 denotes an optical system consisting of a lens, a shutter and a stop; 7, a solid state image pickup element; 8, a drive circuit for driving the optical system and the solid state image pickup element; 9, a signal processing circuit for applying processing such as color processing to signals from the solid state image pickup element; 10, an image memory capable of storing signals outputted from the solid state image pickup element; 11, an image display device (electronic view finder); 12, a level detection circuit for detecting an output level of the solid state image pickup element; 13, a photographing mode setting circuit capable of switching among different photographing modes; and 14, a synchronization control circuit for controlling the entirety of image pickup apparatus.

Here, the six-phase pulses of ΦV1, ΦV2A, ΦV2B, ΦV3, ΦV4A, ΦV4B, ΦV5 and ΦV6 are applied to the solid state image pickup element from the drive circuit 8.

Figure 4:
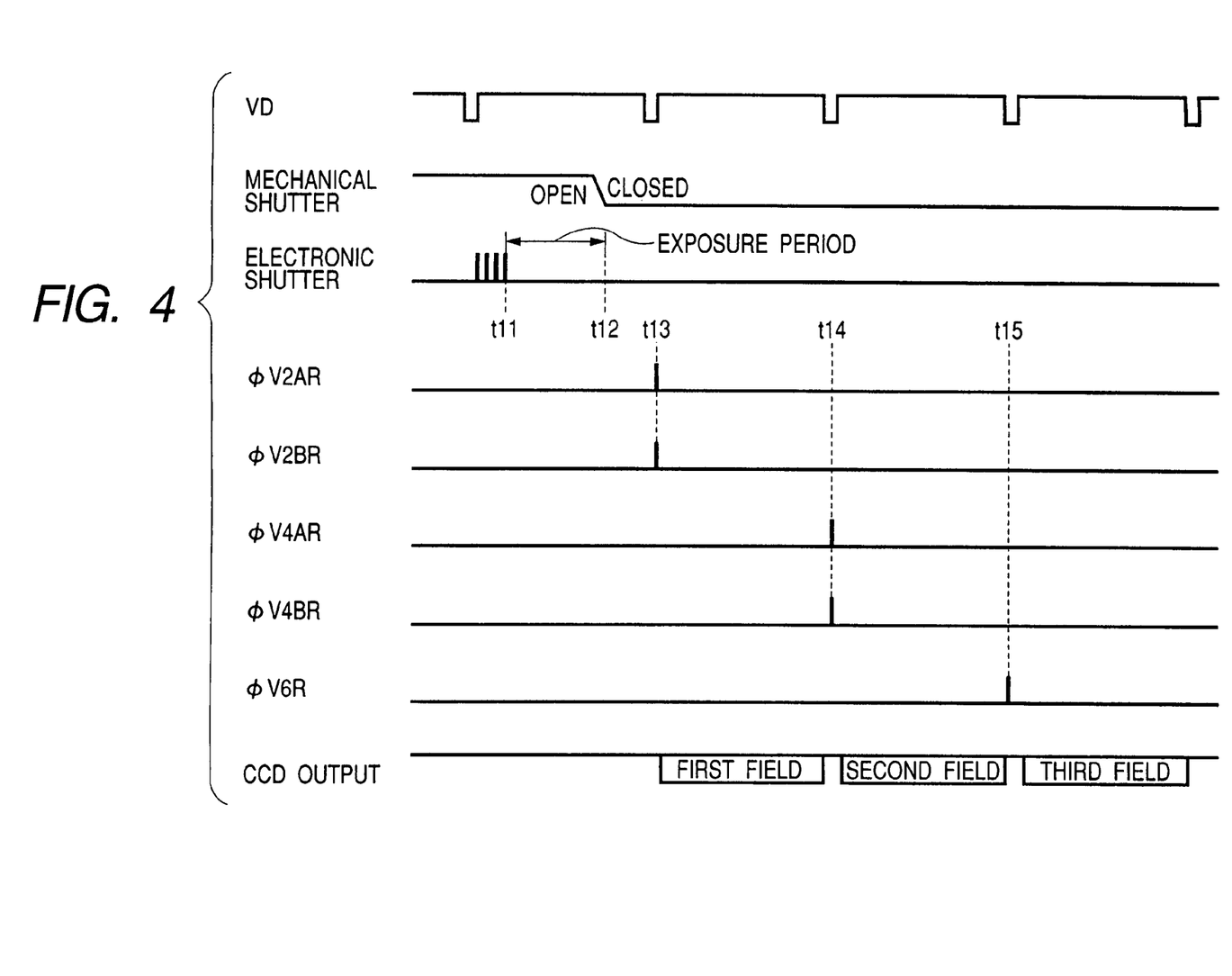
FIG. 4 is a timing chart for explaining a first photographing mode in the embodiment of the present invention.
Figure 5A:
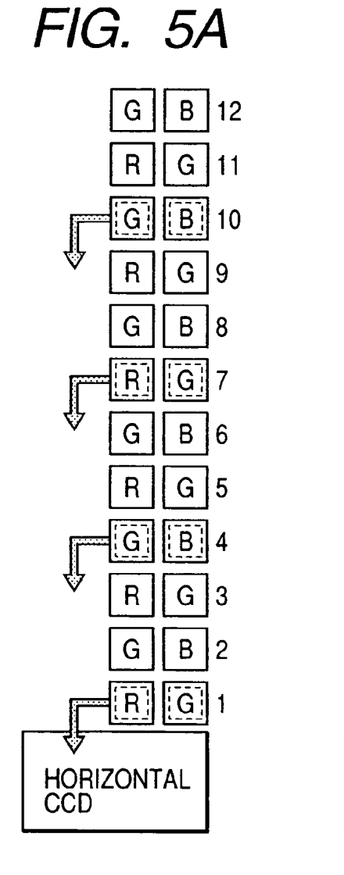
FIGS. 5A, 5B and 5C are views showing arrangements of pixels for explaining the first photographing mode in the embodiment of the present invention.
Figure 5B:
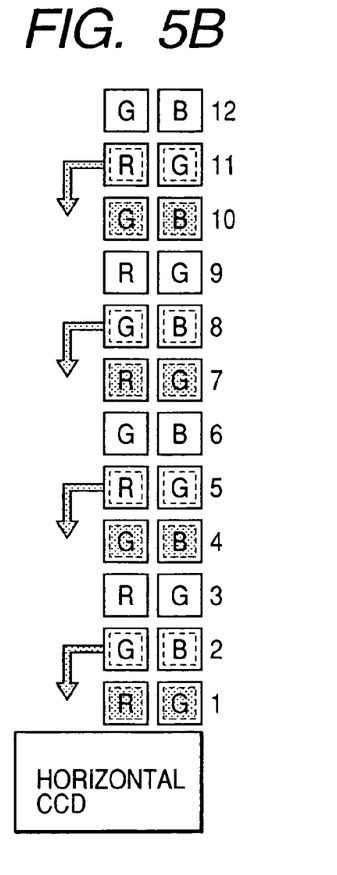
Figure 5C:
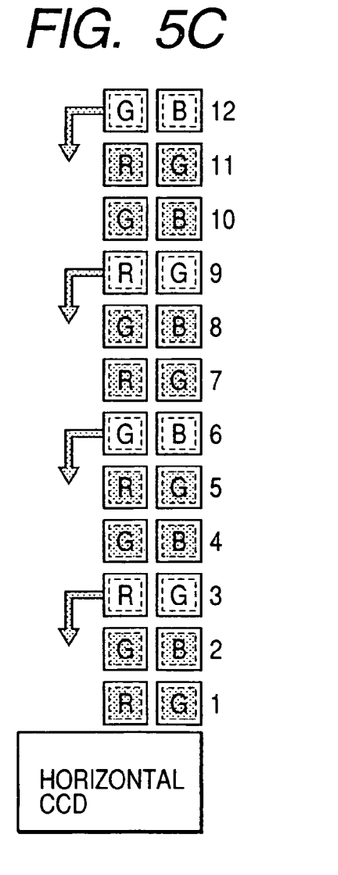

A first photographing mode will be described with reference to a timing chart of FIG. 4 and arrangements of pixels of FIG. 5. It is assumed that the first image pickup mode is a mode for reading out charges of all the pixels in three fields and the number of vertical pixels is 1440.

Reference symbol VD denotes a vertical synchronizing signal. A mechanical shutter opens and closes to control exposure, and an electronic shutter adds a pulse to a substrate voltage of the solid state image pickup element and extracts charges of the pixels in a substrate direction to control exposure.

An exposure period is from time t11 when an electronic shutter pulse ends to time t12 when the mechanical shutter closes. Driving pulses ΦV2AR, ΦV2BR, ΦV4AR, ΦV4BR and ΦV6R indicate only readout pulses that are added to ΦV2A, ΦV2B, ΦV4A, ΦV4B and ΦV6, respectively. In addition, a CCD output indicates an output of the solid state image pickup element.

Since readout pulses are added to ΦV2AR and ΦV2BR at the point of t13, charges of the first horizontal pixel row, the fourth horizontal pixel row, the seventh horizontal pixel row and the tenth horizontal pixel row are read out to the vertical CCDs. This is illustrated in FIG. 5A. These outputted charges form a first field of the CCD output. Signals of 480 lines, which is ⅓ of the number of vertical pixels, are outputted.

Next, since readout pulses are added to ΦV4AR and ΦV4BR at the point of t14, charges of the second horizontal pixel row, the fifth horizontal pixel row, the eighth horizontal pixel row and the eleventh horizontal pixel row are read out to the vertical CCDs. This is illustrated in FIG. 5B. These outputted charges form a second field of the CCD output. Signals of 480 lines, which is ⅓ of the number of vertical pixels, are outputted.

Further, since readout pulses are added to ΦV6AR at the point of t15, charges of the third horizontal pixel row, the sixth horizontal pixel row, the ninth horizontal pixel row and the twelfth horizontal pixel row are read out to the vertical CCDs. This is illustrated in FIG. 5C. These outputted charges form a third field of the CCD output.

Signals of 480 lines, which is ⅓ of the number of vertical pixels, are outputted. The outputted signals of the three fields are once sent to the image memory and arranged in the same manner as the arrangement of the pixels and, then, are subjected to image processing in the signal processing circuit and saved in the image memory again.

Figure 6:
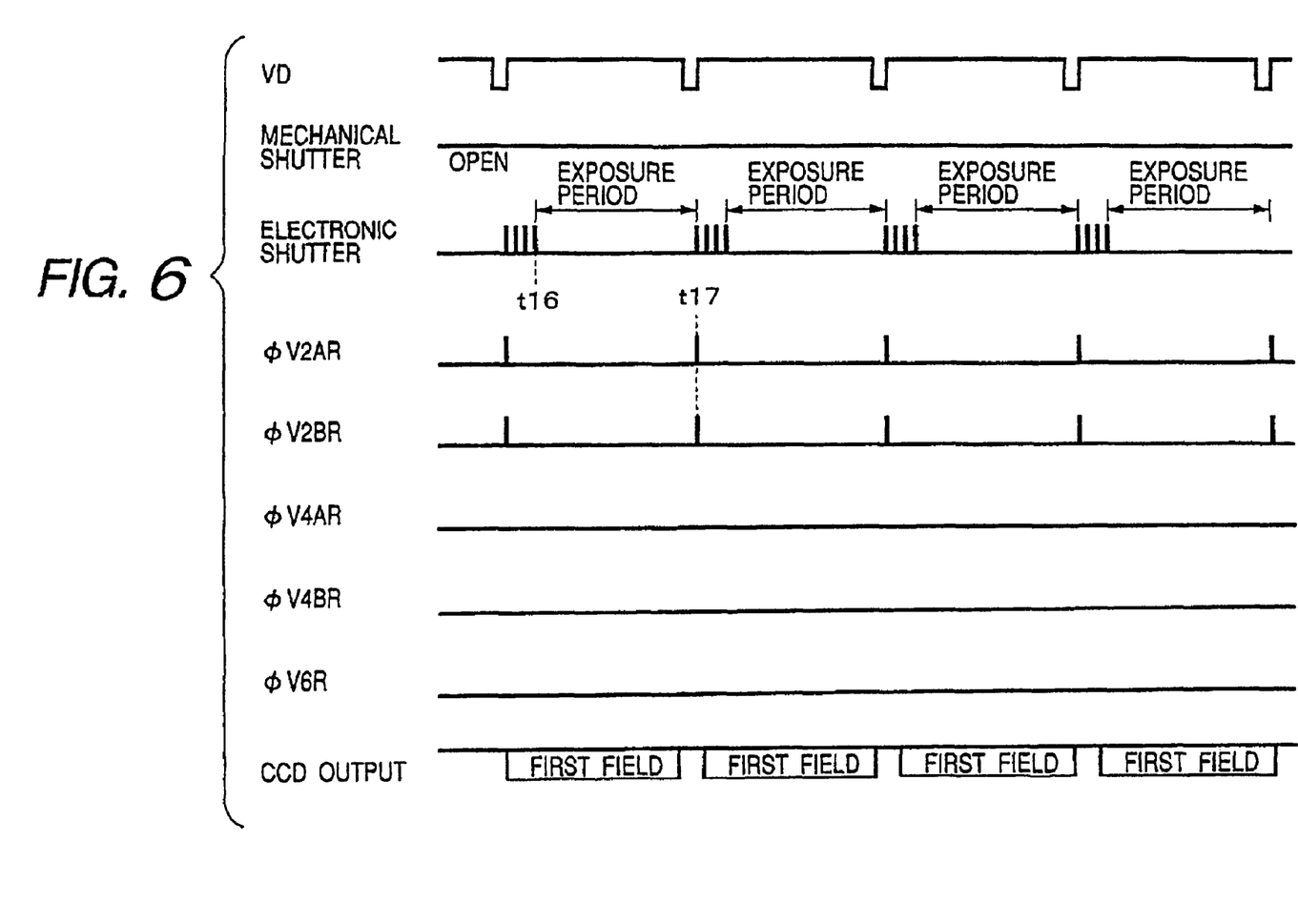
FIG. 6 is a timing chart for explaining a second photographing mode in the embodiment of the present invention.

A second photographing mode will be described with reference to a timing chart of FIG. 6 and an arrangement of pixels of FIG. 5A. The second photographing mode is a mode for repeating one field processing among the three fields, with which moving image photography of vertical 480 lines can be performed. In the second photographing mode, the mechanical shutter is always open and exposure is controlled by the electronic shutter.

In each vertical synchronization period, an exposure period is from time t16 when an electronic shutter pulse ends to time t17 when readout pulses are added. In this embodiment, since only the readout pulses ΦV2AR and ΦV2BR are added, the first field is always outputted. As shown in FIG. 5A, since the first field outputs signals of the same color filter arrangement as the color filter arrangement of the solid state image pickup element, the outputted signals of the first field are subjected to image processing in the signal processing circuit and saved in the image memory.

Figure 7:
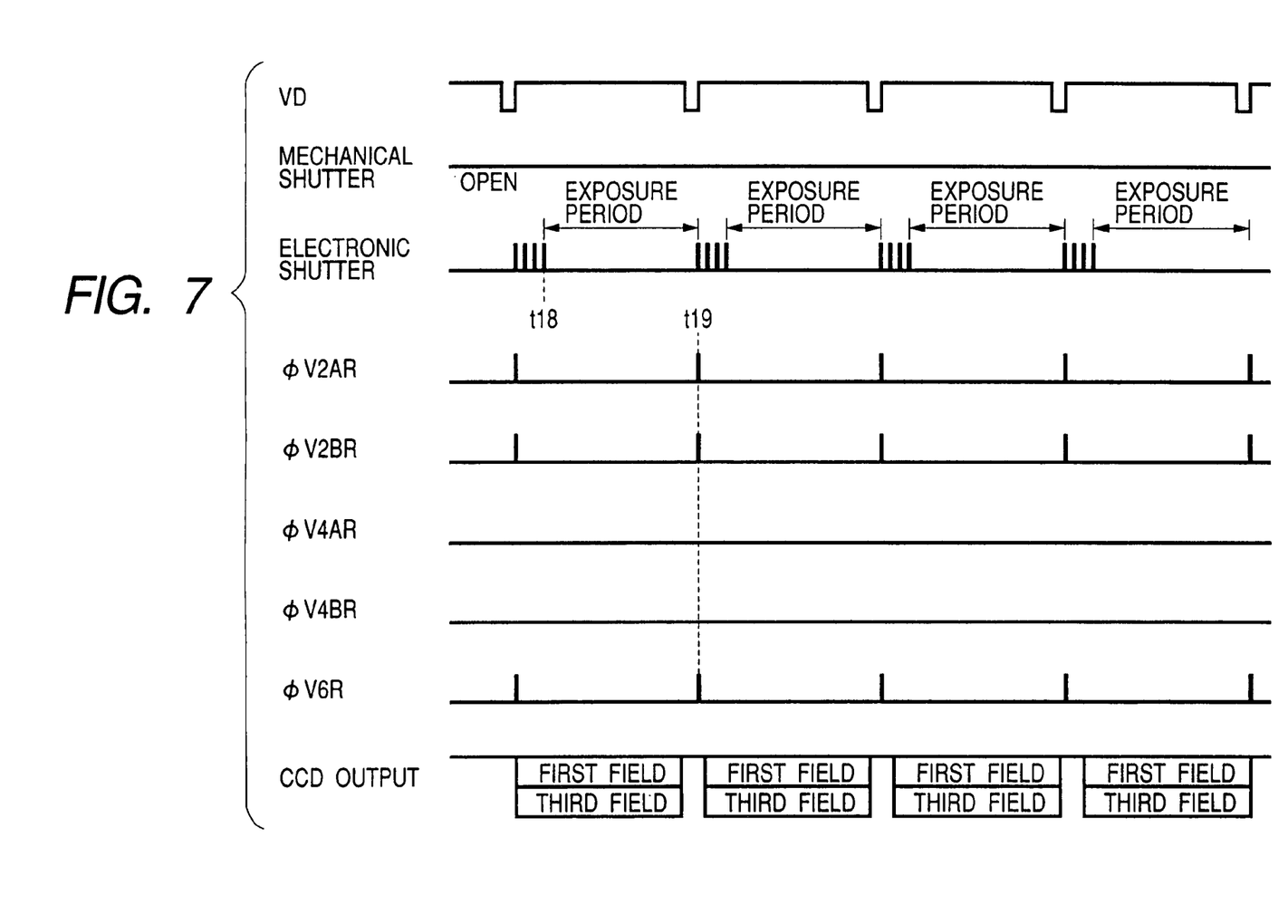
FIG. 7 is a timing chart for explaining a third photographing mode in the embodiment of the present invention.

A third photographing mode will be described with reference to a timing chart of FIG. 7 and an arrangement of pixels of FIG. 8. The third photographing mode is a mode for repeating the processing of reading out the first field and the third field among the three fields and adding them up in the vertical CCDs to output the added-up fields. With this mode, moving image photography of vertical 480 lines can be performed.

If an amount of light of an object decreases and a screen becomes dark during photography in the second photographing mode, the level detection circuit detects a declined output level of the solid state image pickup element and the synchronization control circuit switches the mode to this third photographing mode.

In the third photographing mode, the mechanical shutter is always open and exposure is controlled by the electronic shutter. In each vertical synchronization period, an exposure period is from time t18 when an electronic shutter pulse ends to time t19 when readout pulses are added. In this embodiment, since the readout pulses ΦV2AR, ΦV2BR and V6R are added, the first field and the third field are outputted.

Figure 8:
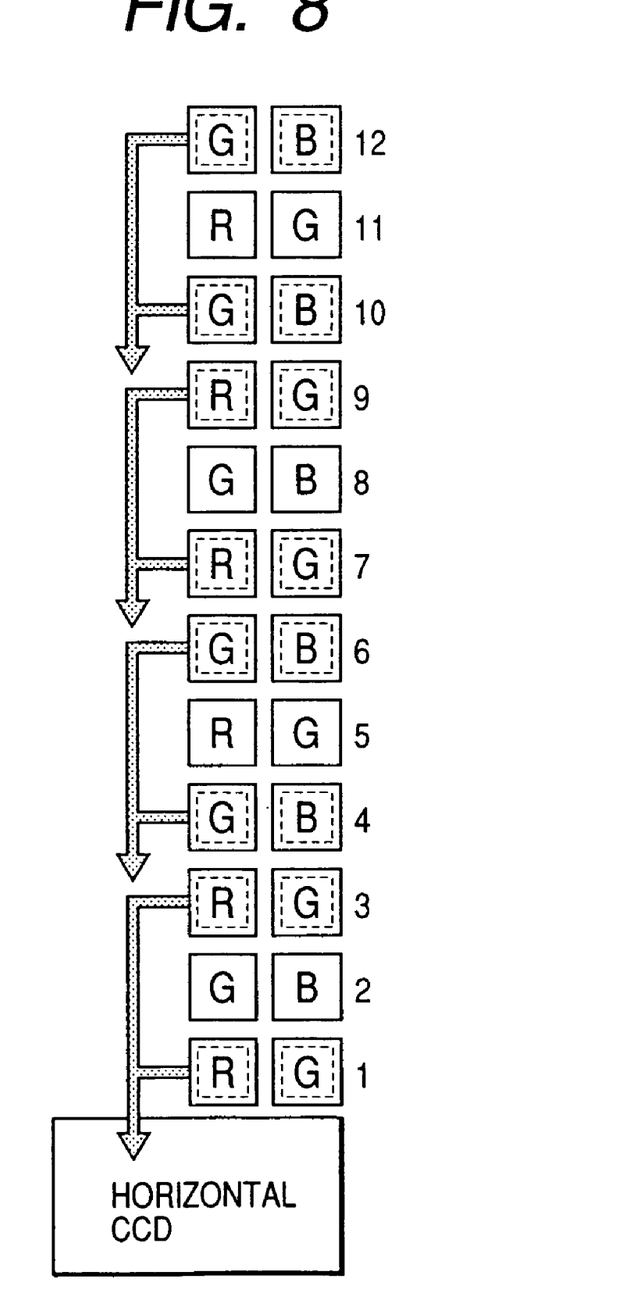
FIG. 8 is a view showing an arrangement of pixels for explaining the third photographing mode in the embodiment of the present invention.

As shown in FIG. 8, since the first field and the third field output signals of the same color filter arrangement as the color filter arrangement of the solid state image pickup element, signals added up by the vertical CCDs come to have the same color filter arrangement as the color filter arrangement of the solid state image pickup element. The outputted signals of the addition field are subjected to image processing in the signal processing circuit and saved in the image memory. Consequently, sensitivity in a dark state is improved.

Figure 9:
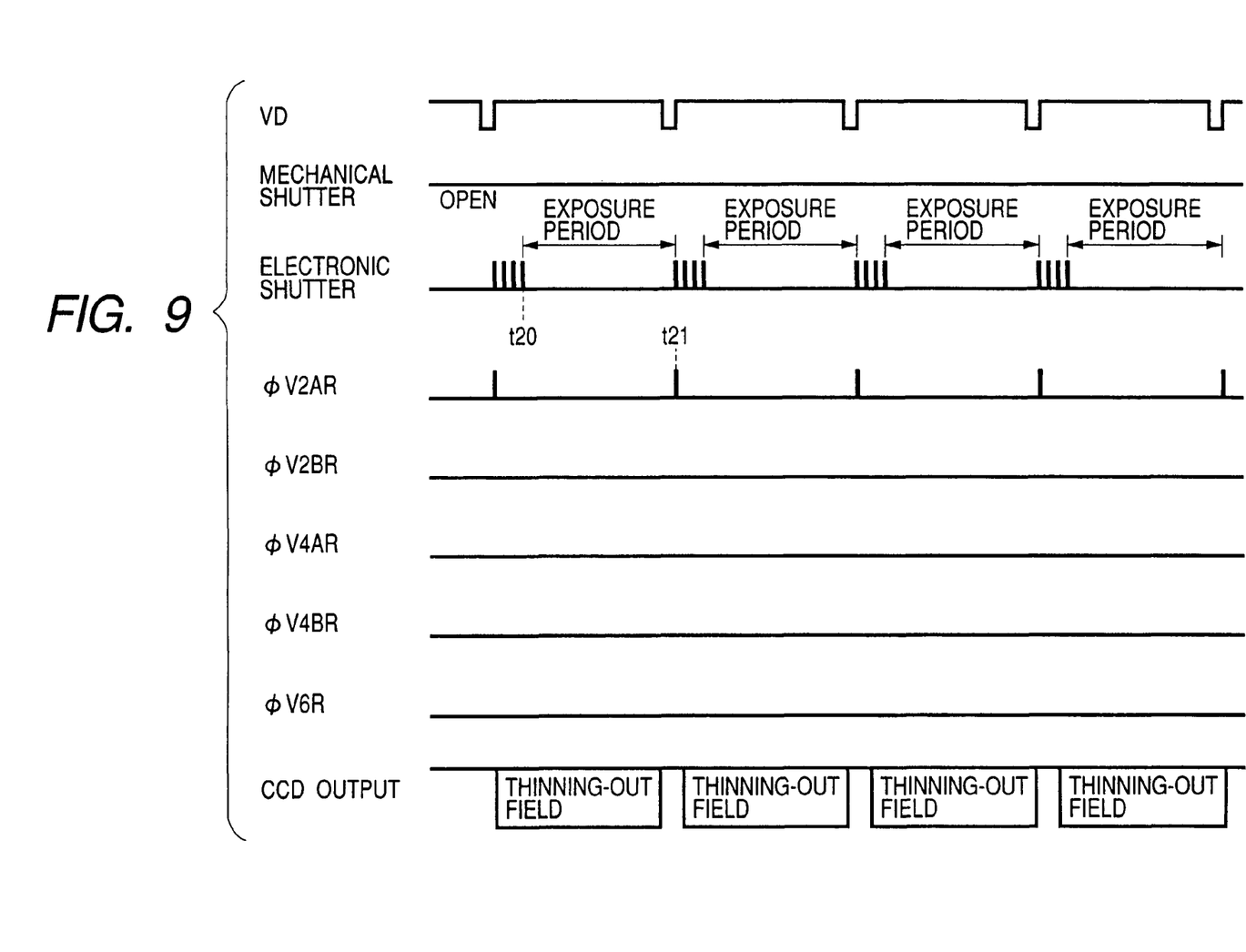
FIG. 9 is a timing chart for explaining a fourth photographing mode in the embodiment of the present invention.

A fourth photographing mode will be described with reference to a timing chart of FIG. 9 and an arrangement of pixels of FIG. 10. The fourth photographing mode is a mode for repeating a thinning-out field to always read out specific two pixels among twelve pixels in the vertical direction, and signals of 240 lines, which is ⅙ of the number of vertical pixels, are outputted. The signals of the vertical 240 lines can be used for moving image photography and, at the same time, are optimal for the number of display lines of an image display apparatus such as an LCD.

In the fourth photographing mode, the mechanical shutter is always open and exposure is controlled by the electronic shutter. In each vertical synchronization period, an exposure period is from time t20 when an electronic shutter pulse ends to time t21 when readout pulses are added. In this embodiment, since only the readout pulse ΦV2AR is added, charges of the first horizontal pixel row and the tenth horizontal pixel row are read out to the vertical CCDs.

Figure 10:
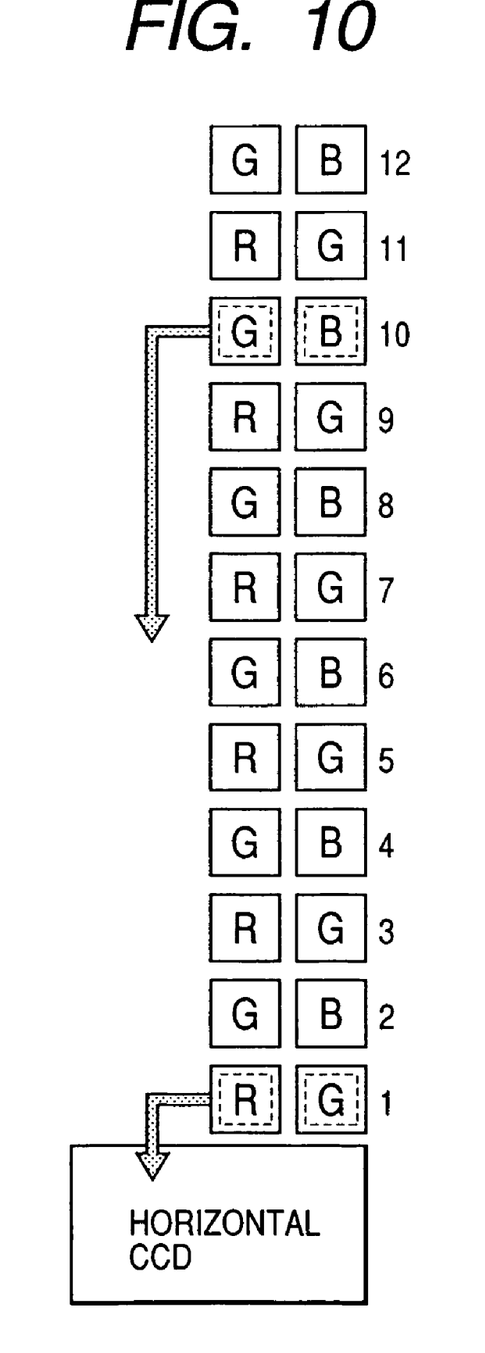
FIG. 10 is a view showing an arrangement of pixels for explaining the fourth photographing mode in the embodiment of the present invention.

As shown in FIG. 10, the thinning-out field outputs signals of the same color filter arrangement as the color filter arrangement of the solid state image pickup element. Thus, the outputted signals of the thinning-out field are subjected to image processing in the signal processing circuit and outputted to an image display device, and can be used for display or can be saved in the image memory.

In addition, as shown in FIG. 10, since charges of the first horizontal pixel row and the tenth horizontal pixel row among the twelve pixels in the vertical direction are read out, charges corresponding to the fourth horizontal pixel row and the seventh horizontal pixel row are not read out as opposed to the first field. Thus, the next horizontal pixel may not be read out simply by causing the vertical CCDs to be driven in six phases to transfer charges for one horizontal pixel row. Therefore, it is necessary to cause the vertical CCDs to always transfer charges for two horizontal pixel rows, which is a combination of a horizontal pixel row with charges, and a horizontal pixel row without charges.

Figure 11:
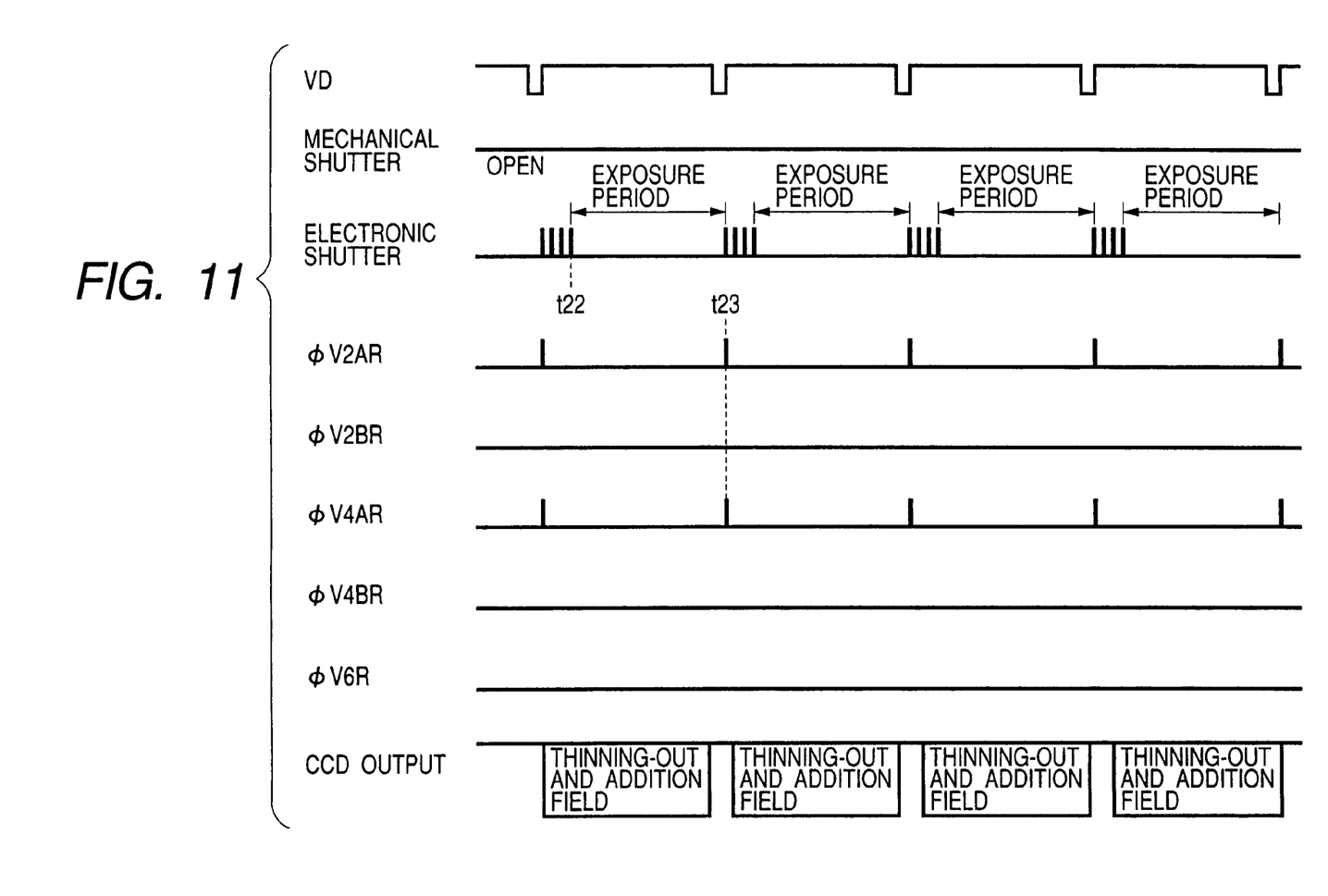
FIG. 11 is a timing chart for explaining a fifth photographing mode in the embodiment of the present invention.
Figure 12:
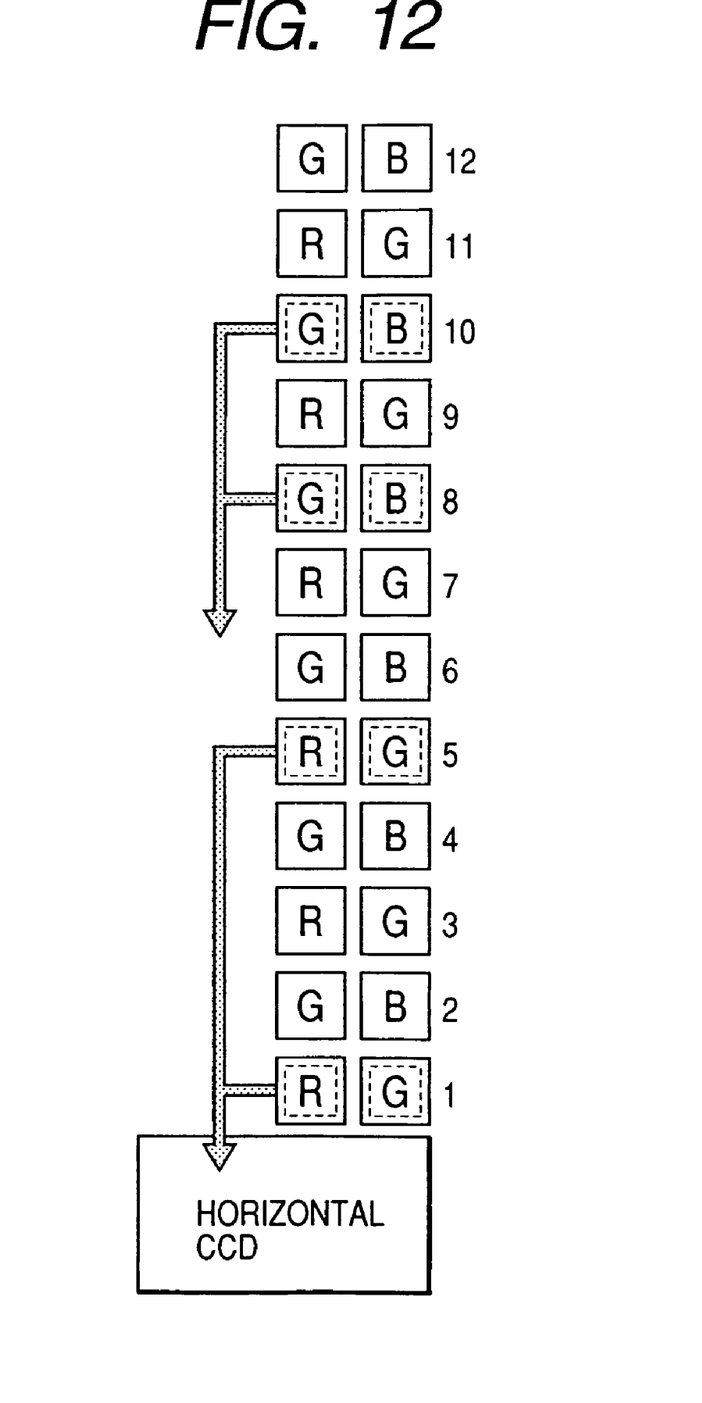
FIG. 12 is a view showing an arrangement of pixels for explaining the fifth photographing mode in the embodiment of the present invention.

A fifth photographing mode will be described with reference to a timing chart of FIG. 11 and an arrangement of pixels of FIG. 12. The fifth photographing mode is a mode for repeating a thinning-out and addition field to always read out specific four pixels among the twelve pixels in the vertical direction, and add up charges adjacent to each other in the vertical direction to output them in the horizontal CCD, and signals of 240 lines, which is ⅙ of the number of vertical pixels, are outputted. The signals of the vertical 240 lines can be used for moving image photography and, at the same time, are optimal for the number of display lines of an image display device such as an LCD.

If an amount of light of an object decreases and a screen becomes dark during photography in the fourth photographing mode, the level detection circuit detects a declined output level of the solid state image pickup element and the synchronization control circuit switches the mode to this fifth photographing mode. In the fifth photographing mode, the mechanical shutter is always open and exposure is controlled by the electronic shutter. In each vertical synchronization period, an exposure period is from time t22 when an electronic shutter pulse ends to time t23 when readout pulses are added.

In this embodiment, since the readout pulses ΦV2AR and ΦV4AR are added, charges of the first horizontal pixel row, the fifth horizontal pixel row, the eighth horizontal pixel row and the tenth horizontal pixel row are read out to the vertical CCDs. As shown in FIG. 12, since the charges of the first horizontal pixel row, the fifth horizontal pixel row, the eighth horizontal pixel row and the tenth horizontal pixel row among the twelve pixels in the vertical direction are read out, it is necessary to add up the charges of the first horizontal pixel row and the fifth horizontal pixel row, and the eighth horizontal pixel row and the tenth horizontal pixel row, respectively, in order to add up charges of pixels of the same color filter. Thus, the addition is realized in the horizontal CCD by causing the vertical CCDs to be driven in six phases to transfer charges for two horizontal pixel rows.

The thinning-out and addition field outputted in this way outputs signals of the same color filter arrangement as the color filter arrangement of the solid state image pickup element. Thus, the outputted signals of the thinning-out and addition field are subjected to image processing in the signal processing circuit and outputted to an image display device, and can be used for display or can be saved in the image memory. Consequently, sensitivity in a dark state is improved.

The above-described first photographing mode is used for photographing a still image as a high definition photographing mode, the second photographing mode is used for photographing a moving image as a moving image photographing mode, and the fourth photographing mode is used for displaying a moving image on an image display device as an image display mode.

Further, the photographing modes are switched by the photographing mode setting circuit.

In each of the moving image photographing mode and the image display mode, the level detection circuit detects the declined output level of the solid state image pickup element and switches the modes to the third photographing mode (moving image photographing mode) and the fifth photographing mode (image display mode), in which sensitivity can be improved, respectively.

The synchronization control circuit controls the drive circuit, the signal processing circuit, the image memory and the image display device so as to realize each photographing mode.

In addition, in the third photographing mode, charges of the first field and the third field read out to the vertical CCDs from pixels are added up in the vertical CCDs. Then, an amount of saturated charges of one pixel and an amount of transferred charges of the vertical CCDs are set as substantially the same. Therefore, if charges for two pixels are added up, it is possible that the charges exceed the amount of transferred charges of the vertical CCDs and overflow. If this phenomenon occurs, signals in the vertical direction are mixed therein with the result that vertical resolution as luminance decreases and, at the same time, color information cannot be separated, affecting an image quality adversely.

Figure 13:
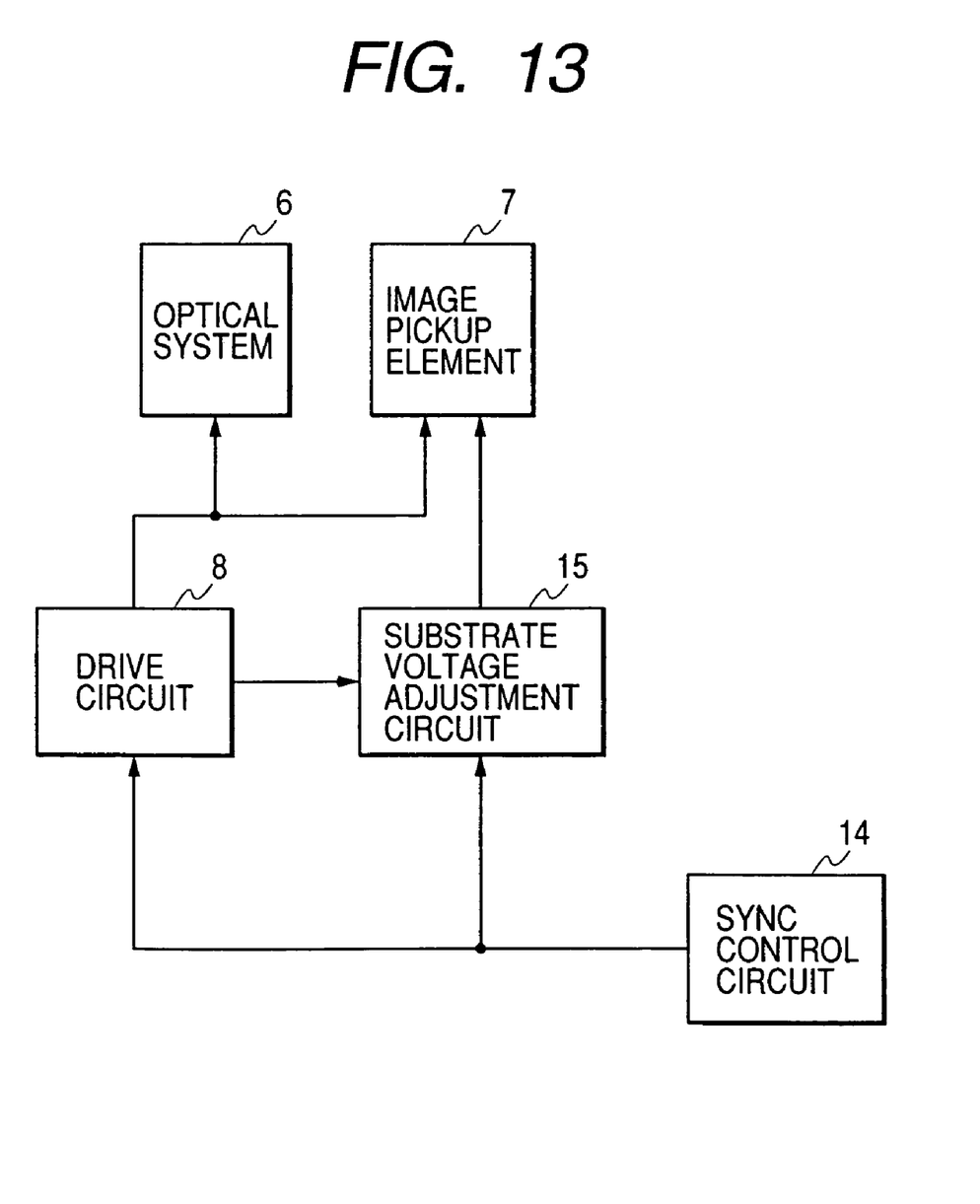
FIG. 13 is a block diagram of an image pickup apparatus provided with a substrate voltage adjustment circuit.

The solid state image pickup element can change an amount of charges, which can be accumulated in pixels, by changing a voltage applied to a substrate. Thus, the above-described problem can be solved by providing the substrate voltage adjustment circuit 15 as shown in FIG. 13.

That is, following the switching to the third photographing mode, change in a substrate voltage is instructed to the substrate voltage adjustment circuit from the synchronization control circuit. Then, the amount of charges, which can be accumulated in pixels, is reduced to a half or less of the amount or is reduced to an amount equal to or less than a half of an amount of transferred charges of the vertical CCDs, whereby the above-described problem can be avoided.

As described above, according to this embodiment, in the image pickup device, two kinds of thinning-out modes, namely, the moving image photographing mode and the image display mode, can be realized in addition to the high definition photographing mode and, at the same time, sensitivity at photography in a dark state is improved.

Moreover, if charges of two pixels are added up in the vertical CCDs, the problem in that the charges exceed the amount of transferred charges of the vertical CCDs and overflow can be improved.

Although the CCD type image pickup element is described above as the image pickup element of this embodiment, a CMOS image sensor or the like of an XY address type may also be used.

In addition, although interlace readout of three fields is described above, for example, interlace readout of five fields may also be used.

According to this embodiment of the present invention, it is possible to provide an image pickup apparatus that is capable of obtaining images corresponding to various applications.

Many widely different embodiments of the present invention may be constructed without departing from the spirit and scope of the present invention. It should be understood that the present invention is not limited to the specific embodiments described in the specifications except as defined in the appended claims.

What is claimed is:

1. An image pickup apparatus comprising:
a plurality of pixels which generate charge signals, wherein the plurality of pixels are arranged in a horizontal direction and a vertical direction to form a plurality of horizontal pixel lines;
a plurality of vertical charge transfer elements which transfers the charge signals generated by the plurality of pixels in the vertical direction;
a horizontal charge transfer element which transfers the charge signals transferred by said plurality of vertical charge transfer elements, in the horizontal direction; and
a mode setting unit adapted to set a first image pickup mode and a second image pickup mode of the image pickup apparatus,
wherein in said first image pickup mode, charge signals of a plurality of fields are read out, and the charge signals of predetermined lines of the plurality of horizontal pixel lines are read out in each field, each field in the first image pickup mode comprising a set of charge signals read from a predetermined plurality of horizontal pixel lines that are read out at the same time, and
wherein in said second image pickup mode,
the charge signals from fewer than all of the horizontal pixel lines of one of the fields defined in said first image pickup mode are read out at the same time,
the charge signals from fewer that all of the horizontal pixel lines of another one of the fields defined in said first image pickup mode are read out at the same time, and
the read-out charge signals from fewer than all of the horizontal pixel lines of the one of the fields defined in said first image pickup mode and the read-out the charge signals from fewer than all of the horizontal pixel lines of the another one of the fields defined in said first image pickup mode are added together to form an image of one frame.

2. An image pickup apparatus according to claim 1, further comprising:
a substrate voltage adjusting unit adapted to adjust an amount of charge which the pixel is allowed to accumulate therein, by changing a voltage to be supplied to a substrate on which said plurality of pixels are formed,
wherein in case of the second image pickup mode, said substrate voltage adjusting unit reduces an amount of charge which the pixel is allowed to accumulate therein, by half or below half of a charge amount which the vertical charge transfer element can transfer in one transfer operation thereof.

3. An image pickup apparatus according to claim 1, further comprising:
a color filter array which is arranged on said plurality of pixels arranged in the vertical and horizontal direction so that a first color filter array in which a red filter and a green filter are arranged repeatedly in the horizontal direction, and a second color filter array in which the green filter and a blue filter are arranged repeatedly in the horizontal direction are arranged alternately in the vertical direction.

4. An image pickup apparatus according to claim 1, further comprising:
a lens for focusing incident light onto said plurality of pixels;
a signal processing circuit which processes a signal output from the horizontal charge transfer element; and
an image display unit adapted to display an image represented by the signal processed by said signal processing circuit.

5. An image pickup apparatus according to claim 1, wherein in the first image pickup mode, charge signals of all of the horizontal pixel lines are read out by reading out charge signals from different sets of horizontal pixel lines at different times, each set comprising a plurality of horizontal pixel lines, the sets together comprising all of the horizontal pixel lines, the charge signals from each set being read out at the same time, and charge signals from each set defining a field.

* * * * *

UNITED STATES PATENT AND TRADEMARK OFFICE
CERTIFICATE OF CORRECTION

PATENT NO.         : 7,804,540 B2
APPLICATION NO.    : 11/435897
DATED              : September 28, 2010
INVENTOR(S)        : Toshikazu Yanai It is certified that error appears in the above-identified patent and that said Letters Patent is hereby corrected as shown below:

COLUMN 10:

Line 1, "that" should read --than--.

Signed and Sealed this
Third Day of May, 2011

David J. Kappos
*Director of the United States Patent and Trademark Office*